United States Patent
Snyder et al.

[11] Patent Number: 5,409,285
[45] Date of Patent: Apr. 25, 1995

[54] SLIDING VISOR

[75] Inventors: Ronald P. Snyder, Holland; Douglas J. Redder, Hamilton, both of Mich.

[73] Assignee: Prince Corporation, Holland, Mich.

[21] Appl. No.: 229,171

[22] Filed: Apr. 18, 1994

[51] Int. Cl.⁶ ............................................. B60J 3/02
[52] U.S. Cl. ............................ 296/97.11; 248/279
[58] Field of Search ............... 296/97.9, 97.11, 97.12, 296/97.13; 248/279, 286

[56] References Cited

U.S. PATENT DOCUMENTS

| | | | |
|---|---|---|---|
| 2,284,784 | 6/1942 | Westrope | 296/97.12 X |
| 4,227,241 | 10/1980 | Marcus | 362/61 |
| 4,582,356 | 4/1986 | Kaiser et al. | 296/97.11 |
| 4,763,946 | 8/1988 | Robbins et al. | 296/97.1 |
| 4,925,233 | 5/1990 | Clark | 296/97.11 |
| 4,998,765 | 3/1991 | Van Order et al. | 296/97.11 |
| 5,004,289 | 4/1991 | Lanser et al. | 296/97.12 |
| 5,044,687 | 9/1991 | Abu-Shumays et al. | 296/97.11 |

FOREIGN PATENT DOCUMENTS

3324305A1  7/1983  Germany .

*Primary Examiner*—Dennis H. Pedder
*Attorney, Agent, or Firm*—Price Heneveld Cooper DeWitt & Litton

[57] ABSTRACT

A sliding visor has a relatively thin body which accommodates a pivot rod assembly with a substantially flat elongated torque control for controlling the pivotal movement of the visor around the axis of a visor pivot rod for selectively raising and lowering the visor during use. The visor body includes an opening for receiving the pivot rod and torque control anti a guide member for slidably engaging opposite sides of the torque control for allowing the visor body to slide relative to the pivot rod and torque control.

20 Claims, 2 Drawing Sheets

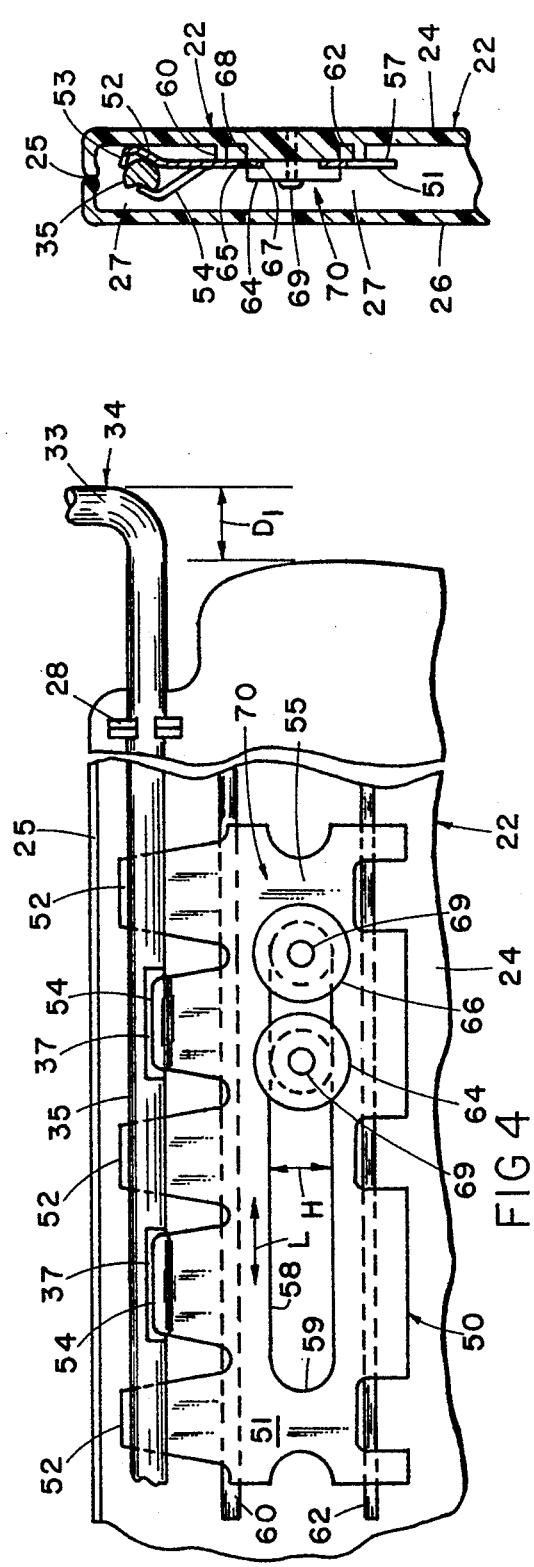
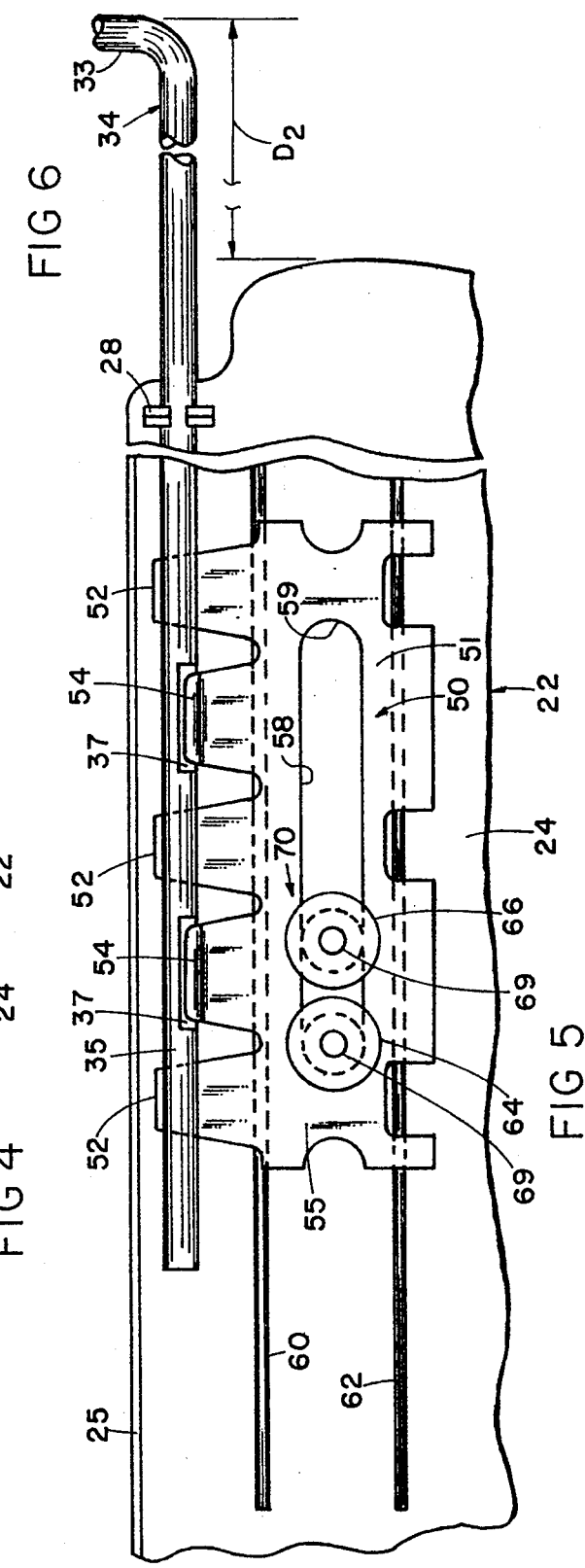

SLIDING VISOR

BACKGROUND OF THE INVENTION

The present invention relates to vehicle visors and particularly to a laterally adjustable vehicle visor which slides along its pivot axle for adjustment of the position of the visor.

There are a variety of visors which provide front and side window protection against sunlight. It is desirable to provide a visor which can be adjusted not only with respect to the angle of tilt about its pivot axle but also longitudinally along its pivot axle so that it can be moved to an optimal sun blocking position. U.S. Pat. No. 4,925,233 discloses a visor system in which a visor body slides along the longitudinal axis of its pivot rod assembly and one in which the visor body includes a channel and guide rods for slidable movement with respect to a torque device associated with the pivot rod and visor body for selectably holding the visor in selected lowered use positions. Although such a visor system provides optimal sun blocking protection for the single visor installation disclosed, the mechanism by which the visor moves with respect to its pivot rod is somewhat complex and therefor costly.

U.S. Pat. No. 4,998,765 discloses a sliding visor which is employed as a secondary or auxiliary visor and which also provides for sliding movement of the visor along its pivot rod. Such visor however does not include a torque device within the visor body to cooperate with the visor rod but rather the visor rod and visor body pivot together when the visor is raised and lowered.

SUMMARY OF THE PRESENT INVENTION

The sliding visor of the present invention provides a relatively thin visor body which accommodates a substantially flat elongated torque control for controlling the pivotal movement of the visor around the axis of the visor pivot rod for selectively raising and lowering the visor during use. In a preferred embodiment of the invention the sliding visor includes a pivot rod assembly having a torque control mounted to an end of a pivot rod having an opposite end secured to the roof of a vehicle. The visor body includes an opening for receiving the pivot rod and torque control and includes guide means within the visor body for slidably engaging opposite sides of the torque control.

In a preferred embodiment, the torque control includes a slot through which the guide means extends for allowing the visor body to slide relative to the pivot rod and torque control. Thus, the sliding interface takes place between the visor body and torque control while the visor body and torque control are allowed to rotate about the pivot rod. The resultant sliding visor provides a relatively thin cost effective visor which has the advantage of being slidable along the longitudinal length of its pivot rod assembly to provide selectable sun blocking protection for the fixed width visor. The visor includes a full-sized torque control for optimal control of the visor movement in its rotation between a raised stored position and selected lowered use positions. These, and other features, objects and advantages of the present invention will become apparent upon reading the following description thereof together with reference to the accompanying drawings in which:

BRIEF DESCRIPTION OF THE DRAWINGS

FIG. 4 is an enlarged fragmentary, partly broken-away front elevational view of one-half of the core of the visor and showing the torque control and pivot rod relationship to the visor core in the first position;

FIG. 5 is an enlarged fragmentary, partly broken-away view of the structure shown in FIG. 4 with the visor moved to a second adjusted position; and FIG. 6 is a fragmentary cross-sectional view of the visor body and torque control taken along section lines VI—VI of FIG. 1.

DETAILED DESCRIPTION OF THE PREFERRED EMBODIMENT

Figure 1:
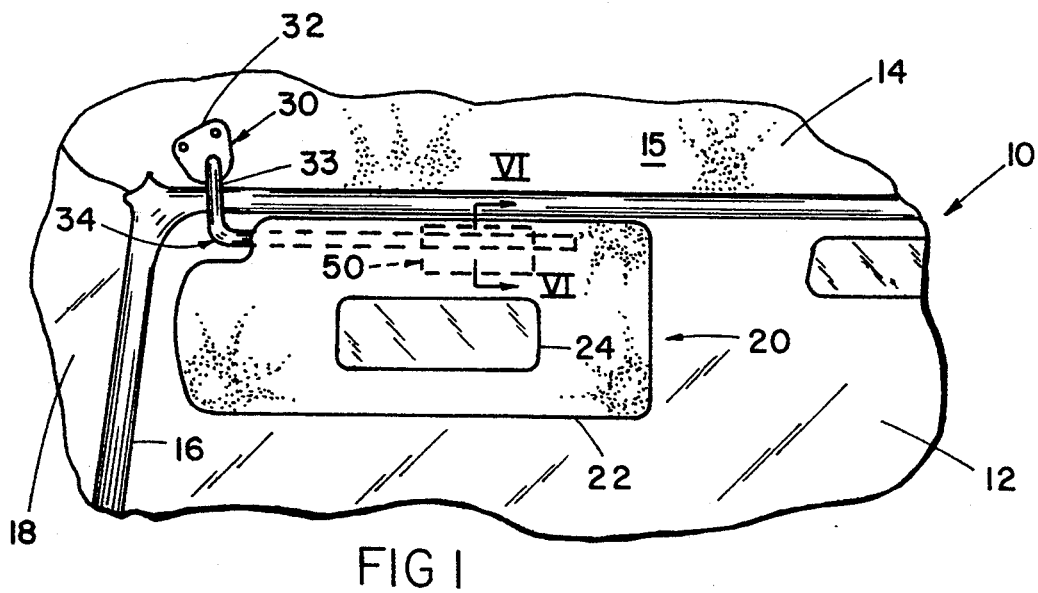
FIG. 1 is a fragmentary perspective view of a vehicle having a visor assembly embodying the present invention shown in a first lowered use position.
Figure 2:
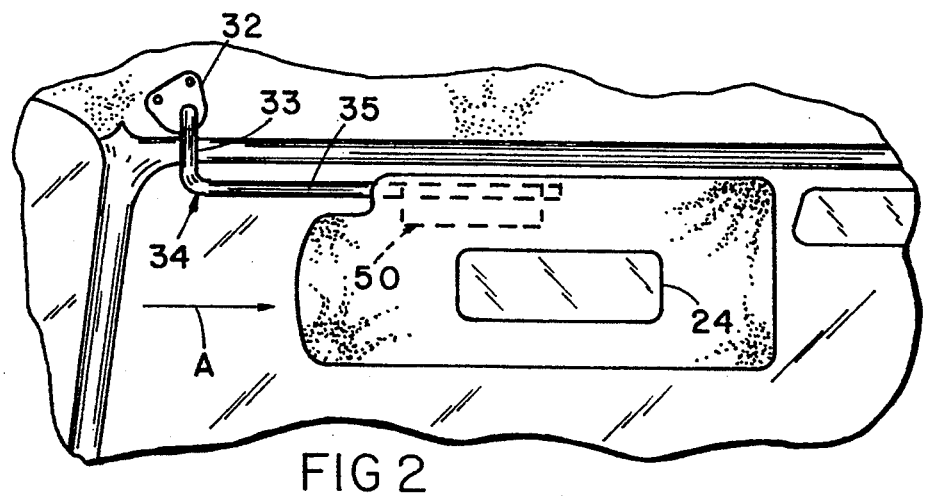
FIG. 2 is a fragmentary perspective view of the structure shown in FIG. 1 with the visor shown in a second use position with the visor body moved along its pivot rod toward the rear view mirror of the vehicle.
Figure 3:
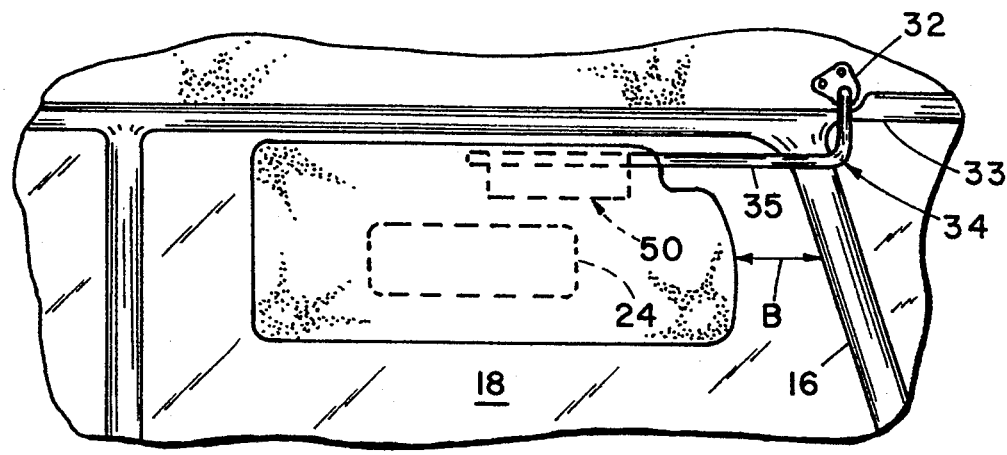
FIG. 3 is a fragmentary perspective view of the structure shown in FIGS. 1 and 2 with the visor shown moved to a side window position in the vehicle.

Referring initially to FIGS. 1-3 there is shown a vehicle 10 such as an automobile which includes a windshield 12 and a roof covered by a headliner 14 with an upholstered surface 15 to provide a trim appearance to the vehicle. There is shown one of the A-pillars 16 separating the windshield and a side window 18. A visor assembly 20 of the present invention is shown on the driver's side of the vehicle and includes a visor body 22 which is mounted to the roof of the vehicle by means of a pivot rod assembly 30 including a elbow mounting bracket 32 which secures one end 33 of an L-shaped visor pivot rod 34 to the vehicle in a conventional manner.

Pivot rod 34 includes an elongated opposite end 35 which extends within an opening along the upper edge of the visor body and to which a torque control 50 is mounted for controllably mounting the visor body 22 to the pivot rod 34. The torque control 50 allows the visor body to be moved from a raised stored position adjacent the headliner 14 to a lowered use position shown in FIGS. 1 and 2. The mounting relationship of the visor body 22 to the torque control 50 also allows the visor body to be moved from a first position shown in FIG. 1 to an adjusted position shown in FIG. 2 in which the visor slides along the longitudinal axis of leg 35 of pivot rod 34. In the preferred embodiment of the invention, the visor body 22 includes an illuminated vanity mirror assembly 24 which can be of the type disclosed in U.S. Pat. No. 4,227,251.

The visor assembly 20 allows the visor body 22 to move along the pivot rod 34 when in the front windshield position between the end position shown in FIG. 1 and the end position shown in FIG. 2 in a direction indicated by arrow A in FIG. 2 or in any desired intermediate position. Similarly, when the visor is lowered and moved to the side window position shown in FIG. 3, it is moveable along the longitudinal axis of visor pivot rod end 35 in a direction indicated by arrow B to a selected position either proximate A-pillar 16 or distal therefrom. The relationship of the visor body 22 to the pivot rod assembly 30 and torque control 50 allowing such adjustable movement is now described in detail with reference to FIGS. 4-6.

Referring initially to FIG. 6, the visor body 22 comprises a visor core which can be of a butterfly-type construction such as disclosed in U.S. Pat. No. 4,763,946, the disclosure of which is incorporated herein by reference. The core includes a front wall 24 integral with the rear wall 26 each made of a molded polymeric material hinged along top edge 25 by a relatively thin section of the polymeric material which may be polypropylene or other suitable polymeric material used for visor core construction. The visor core is covered by a suitable upholstery material (not shown in FIG. 6). The visor core defines a relatively thin interior space 27 or opening along the top edge of the visor body so formed which receives the visor torque control near the top edge 25 of the visor. The core halves 24 and 26 receive the pivot rod assembly 30 and torque control 50 thereon prior to being folded over and snapped together as taught in the above identified '946 patent. For such purpose, wall 24 of the visor core may include a resilient semi-cylindrical socket 28 integrally formed of the same polymeric material as the core 22 for temporarily holding the visor rod end 35 and torque fitting 50 thereon until final assembly. The socket 28 relatively loosely receives pivot rod end 35 for allowing the visor body 22 to slide along pivot rod end 35 after final assembly.

Mounted to the end 35 of the pivot rod assembly 34 is a torque control 50 which is a relatively thin stamped spring steel elongated rectangular planar member having alternately staggered legs 52 and 54 extending from its top edge as seen in FIGS. 4 and 5. These legs extend on opposite sides of the pivot rod end 35 as seen in FIG. 6 and engage flats 37 formed on the pivot rod end 35 which cooperate with legs 52 and 54 for urging and holding the visor in a selected lowered use position and a raised store position against the vehicle roof for storage. This structural aspect of the torque control is substantially the same as taught in U.S. Pat. No. 5,004,289 which discloses a similar upper section of a torque control and its relationship to the pivot rod is more fully disclosed in such patent, the disclosure of which is incorporated herein by reference for such teaching. As seen in FIG. 6, legs 54 engage one side of the pivot rod end 35 while legs 52 include a tip 53 which overlies the top of pivot rod end 35 and therefor holds the torque control in captive relationship to the pivot rod with legs 52 and 54 compressibly engaging the pivot rod and selectively engaging the flats 37 formed thereon as also seen in FIG. 6.

The torque control 50 includes a first surface 51 and an opposite surface 57 (FIG. 6) with legs 52 and 54 extending from the upper edge of the body of 55 of the torque control. Extending longitudinally along the longitudinal axis L (FIG. 4) of torque control 50 in the central body area is an elongated slot 58 having rounded opposite ends 59. Slot 58 receives guide means 70 which co-operates with the torque control and visor core to allow the sliding movement of the visor body 22 with respect to the torque control 50 which is longitudinally fixed with relationship to the pivot rod end 35 but as described above allows the visor body 22 to pivot about the pivot rod axis between the raised stored position and selected lowered use positions.

The guide means 70 associated with the visor body and cooperating with the torque control includes a raised slide rails 60 and 62 which are integrally formed on the inner surface of visor core wall 24 and which engage surface 57 of torque control 50 above and below slot 58 formed therein. Rails 60 and 62 define first engaging members slidably engaging one side of the torque control 50. The guide means further includes second engaging means comprising in a preferred embodiment disks 64 and 66 with enlarged heads which have inner annular surfaces 65 (FIG. 6) which engage surface 51 of the torque fitting 50. Each of the disks 64 and 66 has a circular central section 67 (FIG. 6) having a diameter slightly less than the height H (FIG. 4) of slot 58 to allow the torque fitting to freely slide with respect to the horizontally spaced disks 64 and 66 from a position closest the pivot rod elbow as shown in FIG. 4 represented by distance D1 to a position most distant therefrom as shown in FIG. 5 as represented by distance D2 in the embodiment shown.

A spacer washer 68 extends behind and engages the central shaft 67 of each of the disks 64 and 66 for providing additional sliding support behind surface 57 of the torque control. The distance between the surface of spacer washers 68 facing surface 57 and surface 65 of each of the disks 64 and 66 is greater than the thickness of torque control 50 so as to allow the free sliding movement of the torque control between spacer washer 68 and disks 64 and 66 as well as rails 60 and 62 and still hold the visor in an adjusted position. In the embodiment shown, each of the disks 64 and 66 is mounted to the visor core half 24 by means of threaded fasteners such as screws 69 although, as can be appreciated, other fastening means can be employed.

In the preferred embodiment of the invention, the guide means for the sliding torque control includes interconnected first and second engaging means on opposite sides of the torque control and through slot 58 for captively engaging opposite sides of the torque control. In this embodiment a pair of spaced disks 64 and 66 are employed to provide lateral stability of the torque control to visor body interface to prevent tilting of the visor body with respect to the torque control. As can be appreciated, other guide means for slidably supporting the torque control may include a single elongated member which engages one side 51 of the torque control and extends through slot 58 and communicates with core half 24. As can also be appreciated, the spacer washer 68 can be integrally formed with the core 24 as can be the central portion 67 of the disks 62 and 64 which then would become washer-shaped. It is important, however, that the torque control 50 includes an elongated slot permitting sliding movement of the visor body with respect to the torque control and there be provided guide means which extends through such slot and captively hold the torque control to the visor core while allowing sliding movement relative to each other.

The visor construction of the present invention therefore provides a relatively thin and compact visor body which is suitable for rise in modern vehicles with reduced interior space and allows adjustability of a single visor body for providing maximum sun blocking protection and yet desired torque control of the visor movement about the pivot axis of the pivot rod for adjustment between a raised stored position adjacent the vehicle roof to selected lowered use positions. It will become apparent to those skilled in the art that the various modifications to the preferred embodiment of the invention as described herein can be made without departing from the spirit or scope thereof as defined by the appended claims.

The embodiments of the invention in which an exclusive property or privilege is claimed are defined as follows.

1. A sliding visor for a vehicle comprising:
   a pivot rod assembly including a pivot rod and a torque control mounted to one end of said pivot rod; said pivot rod having an opposite end adapted to be attached to the roof of a vehicle, said torque control engaging said one end of said pivot rod to control the rotational movement of said pivot rod within a visor body between a raised stored position and selected lower use positions;
   a visor body having an opening for receiving said one end of said pivot rod and said torque control, said visor body further including guide means for slidably receiving said torque control, said guide means including a first engaging member engaging one side of said torque control, a second engaging member engaging an opposite side of said torque control and a coupling member for coupling said first and second engaging members for captively holding said torque control while allowing said visor body to slide relative to said pivot rod and torque control.

2. The sliding visor as defined in claim 1 wherein said torque control includes an elongated slot, and said coupling means extends through said slot.

3. The sliding visor as defined in claim 2 wherein ends of said slot define stop means limiting the sliding motion of said visor body with respect to said pivot rod.

4. The sliding visor as defined in claim 3 wherein said first engaging member includes a pair of spaced slide rails formed on said visor body to engage said one side of said torque control.

5. The sliding visor as defined in claim 4 wherein said second engaging member includes a surface engaging said torque control on edges of said slot therein on said opposite side of said torque control.

6. The sliding visor as defined in claim 5 wherein said second engaging member includes a pair of spaced disks including central sections extending through said slot in said torque control and said surface of said second engaging member so defined includes annular surfaces defined by heads of said disks having a diameter greater than the width of said slot.

7. The sliding visor as defined in claim 6 wherein said coupling member comprises a fastener fastening each of said disks to the visor body opposite said annular surfaces.

8. A torque control for use in cooperation with a visor pivot rod and visor body comprising:
   a substantially flat elongated member having a plurality of alternately staggered arms extending from one edge of said member and inclined in opposite directions frown one another to extend on opposite sides of a pivot rod for securing the pivot rod to said one edge of said torque control, said torque control including an elongated slot extending along the longitudinal axis of said elongated member in spaced relationship to said alternately staggered arms for cooperating with an engaging member of the visor body to allow said torque control and pivot rod mounted thereto to slide in a controlled fashion within the visor body.

9. The torque control as defined in claim 8 wherein said slot includes rounded ends for defining stops for movement of the engaging member with respect to said torque control.

10. The torque control as defined in claim 9 wherein alternate ones of said arms include tips which captively engage the pivot rod.

11. A sliding visor comprising:
   a visor body including a core defined by two core halves spaced to define an opening therebetween at least at an upper edge of said visor body;
   a pivot rod assembly mounted within said opening of said visor body and including a torque control, wherein said torque control includes an elongated slot formed therein and extending in a direction parallel to the longitudinal axis of said visor body; and
   a guide member coupled to at least one of said core halves and extending through said slot in said torque control for slidably mounting said torque control to said visor body.

12. The sliding visor as defined in claim 11 wherein said torque control includes a substantially flat elongated member having a plurality of alternately staggered arms extending from one edge of said member and inclined in opposite directions from one another to extend on opposite sides of a pivot rod for securing the pivot rod to said one edge of said torque control.

13. The sliding visor as defined in claim 11 wherein said guide member includes at least one disk having an annular surface engaging one side of said torque control.

14. The sliding visor as defined in claim 13 wherein said guide member further includes a pair of spaced slide rails extending from said one core half and engaging an opposite side of said torque control.

15. A sliding visor comprising:
   a visor body including a art opening along an upper edge thereof;
   a pivot rod assembly mounted within said opening of said visor body and including a torque control with a substantially planar lower portions; and
   a guide member coupled to said visor body and engaging opposite sides of said torque control lower portion for slidably mounting said torque control and said pivot rod assembly to said visor body.

16. The sliding visor as defined in claim 15 wherein said torque control includes an elongated slot formed therein which is aligned with the axis of said pivot rod assembly, and wherein said guide member extends through said slot.

17. The sliding visor as defined ill claim 16 wherein said guide member includes a pair of spaced slide rails formed on said visor body and engaging one side of said torque control on opposite edges of said slot.

18. The sliding visor as defined in claim 17 wherein said guide member includes at least one disk-shaped member engaging an opposite side of said torque control and coupled to said visor body through said slot.

19. The sliding visor as defined in claim 18 wherein said disk-shaped member is coupled to said visor body by a fastener extending through said slot.

20. The sliding visor as defined in claim 19 wherein said torque control further includes a plurality of alternately staggered arms extending from one edge of said member and inclined in opposite directions from one another to extend on opposite sides of a pivot rod of said pivot rod assembly for securing the pivot rod to said one edge of said torque control.

* * * * *

UNITED STATES PATENT AND TRADEMARK OFFICE
CERTIFICATE OF CORRECTION

PATENT NO. : 5,409,285
DATED : April 25, 1995
INVENTOR(S) : Snyder et al

It is certified that error appears in the above-indentified patent and that said Letters Patent is hereby corrected as shown below:

Column 1, Line 65;
 "These, and" should be --These and--.

Column 6, Line 36;
 "a art opening" should be --an opening--.

Column 6, Line 40;
 "portions" should be --portion--.

Column 6, Line 50;
 "ill" should be --in--.

Abstract, Line 7;
 "anti" should be --and--.

Signed and Sealed this

Seventeenth Day of October, 1995

BRUCE LEHMAN

*Attest:*

*Attesting Officer*     *Commissioner of Patents and Trademarks*